(12) United States Patent
Logean et al.

(10) Patent No.: US 6,611,955 B1
(45) Date of Patent: Aug. 26, 2003

(54) MONITORING AND TESTING MIDDLEWARE BASED APPLICATION SOFTWARE

(75) Inventors: Xavier Logean, Heremence (CH); Falk Dietrich, Lausanne (CH); Jean-Pierre A. Hubaux, Preverenges (CH); Sylvain Grisouard, Paris (FR); Pierre-Alain Etique, Hinterkappelen (CH); Shawn E. Koppenhoefer, Lausanne (CH)

(73) Assignees: Swisscom AG, Berne (CH); Alcatel, Paris (FR); Ecole Polytechnique Federale de Lausanne (EPFL), Lausanne (CH)

( * ) Notice: Subject to any disclaimer, the term of this patent is extended or adjusted under 35 U.S.C. 154(b) by 0 days.

(21) Appl. No.: 09/324,765

(22) Filed: Jun. 3, 1999

(51) Int. Cl.[7] .............................. G06F 9/44; G06F 9/46; H02H 3/05
(52) U.S. Cl. .......................... 717/128; 714/38; 709/318
(58) Field of Search .................................. 717/4, 2, 7, 8, 717/9, 124, 106, 146, 143, 151, 127, 128; 702/119, 123, 176–178; 714/25, 27, 31, 34–35, 38–39, 45–52; 709/318, 328, 330

(56) References Cited

U.S. PATENT DOCUMENTS

| 4,821,178 A | * | 4/1989 | Levin et al. .................. 714/47 |
| 5,103,394 A | * | 4/1992 | Blasciak ...................... 714/47 |
| 5,450,349 A | * | 9/1995 | Brown, III et al. ........... 714/27 |
| 5,511,185 A | * | 4/1996 | Weinbaum et al. ........... 714/38 |
| 5,872,909 A | * | 2/1999 | Wilner et al. ................. 714/38 |
| 6,134,676 A | * | 10/2000 | VanHuben et al. ........... 714/39 |

OTHER PUBLICATIONS

Comdex Abstract IEEE International Conference on Communications, V2, Jun. 7, 1998.

Information Processing Letters 39 (1991) 343–350 North Holland Sep. 27, 1991 The causal ordering abstraction and a simple way to implement it, Michal Raynal, pp. 343–350.

* cited by examiner

Primary Examiner—Hoang-Vu Antony Nguyen-Ba
(74) Attorney, Agent, or Firm—Pillsbury Winthrop LLP

(57) ABSTRACT

A method for on-line monitoring and testing the behavior of middleware based, distributed application software during run-time of such software is disclosed. In order to automatize the monitoring of the behavior of the application software, the monitoring method comprises: defining events capturing the behavior of the software execution, the events being based on an abstraction of the application software, the abstraction being provided by middleware; using code generating means and an instrumentation technique for automatically adding code to the implementation of the software code suitable for generating traces suitable to be sent to an observer, the information carried by the added code including information on the order of occurrence of the events and on the application software part location where each event occurs; and using a monitoring mechanism based on sending of trace reports to the observer, which ensures or takes into account the time order of the reported traces. In order to automatize testing of the behavior of the application software, the testing method comprises monitoring the behavior of the software during run-time thereof by the above mentioned method, and using a checking mechanism using the information monitored at runtime for checking whether the behavior is violating or has violated predefined properties or constraints.

16 Claims, 2 Drawing Sheets

MONITORING AND TESTING MIDDLEWARE BASED APPLICATION SOFTWARE

FIELD OF THE INVENTION

The invention relates to a method for on-line monitoring the behavior of middleware based, distributed application software during run-time of the latter software. The invention further relates to a method for on-line testing the behavior of middleware based, distributed application software during run-time of the latter software.

BACKGROUND OF THE INVENTION

There is the need to perform monitoring and testing in several fields of applied technical environments, such as communications, in particular telecommunications, automation, and databases.

In the past, solutions for testing and monitoring were based purely on as the intellectual capacities of the developers and their ability to avoid and correct bugs. This ability was developed via experience. The time devoted to test, the complexity of the computer system, the heterogeneity of the architectures and system do not permit today to proceed as in the past.

With the coexistence of software (old and new versions, components from different retailers), there is also a need for continuous monitoring and testing of the behavior of a software.

SUMMARY OF THE INVENTION

A first aim of the invention is therefore to provide a method for on-line monitoring the behavior of middleware based, distributed application software during run-time thereof.

A second aim of the invention is to provide a method for on-line testing the behavior of middleware based, distributed application software during run-time thereof. According to the invention the first aim indicated above is achieved by a monitoring method comprising:

(a) defining events capturing the behavior of the software execution, said events being based on an abstraction of the application software, said abstraction being provided by said middleware, (b) using code generating means and an instrumentation technique for automatically adding to the implementation of the software code suitable for generating traces suitable to be sent to an observer, the information carried by said added code including information on the order of occurrence of said events and on the software part location where each event occurs, and (c) using a monitoring mechanism based on sending of trace reports to said observer which ensures or takes into account the time order of the reported traces.

In order to achieve the above objects, there is provided a method for spying on the distributed application, where the spying is performed on events occurring in the system, where a trace report of the detection of these events is sent to an Observer.

According to the invention the second aim indicated above is achieved by a testing method comprising:

(a) monitoring the behavior of said software during run-time thereof by means of a method according to the invention, and (b) using a checking mechanism for checking whether said behavior is violating or has violated properties or constraints, said properties or constraints being dynamically defined at runtime by the user, (c) expressing properties by the mean of the events that can be observed when the software application is running.

The main advantages of the methods according to the present invention include the following:

The instrumentation providing traces of relevant events is effected automatically.

The methods are independent of a choice of implementation language.

The methods make possible the monitoring and testing of an implementation still being developed or a final version thereof.

It is not necessary to specify the behavior of the entire system.

It is possible to focus the monitoring and testing only on specific part/behavior of the system The methods are easy to use, even for a user not familiar with formal methods.

It is possible to configure the monitoring and testing dynamically at runtime.

Preferred embodiments of a monitoring method according to the invention comprise one or more of the following features:

Events capturing the behavior of the software execution, running on top of a middleware, are defined.

The defined events are generic for middleware softwares.

The defined events to be observed are selectable, and they are in particular selectable at run-time of the software being monitored, so that the set of events that can be monitored is dynamically configurable during said runtime.

The defined events are directly identifiable by the abstraction thereof provided by the middleware or by the interface definition language used, so that no other specification thereof in a different language is necessary.

The monitoring mechanism according to the invention is based on the sending of trace reports to a central or distributed observer.

The order of the reported traces is ensured.

The traces can be displayed in a graphical user interface and can also be stored, e.g. for post processing.

The monitoring method according to the invention makes use of an instrumentation technique that automatically adds code to the implementation of the distributed application software being tested, said code being such that traces of predefined events are sent to the observer. Since the latter instrumentation is performed automatically, there is no need of manual intervention of the user for this purpose.

The traces sent to the observer are preferably transmitted asynchronously,
  displayed by means of a graphical user interface, the traces being represented by a time line, a table or a graph, and stored in a memory for post-processing.

The order of the reported events is reconstructed e.g. either by a logical clock system, a synchronization protocol, or the distributed processing environment.

Preferred embodiments of a testing method according to the invention comprise one or more of the following features:

Properties or constraints are expressed with events by means of a formal language, the expression of said properties or constraints being automatically translated into Finite State Machines or oracle, or some means derived therefrom.

The formal language allows the specification of temporal relations.

The formal language allows the specification of relations between events of same or different types, e.g. application events, error events and/or other events of interest for monitoring purposes (e.g. breakpoints), said events being directly identifiable by the abstraction thereof provided by the middleware or by the interface definition language used, and said events being selectable at run-time of the software being monitored.

The formal language allows the specification of procedural dependencies.

Properties are expressed independently from the implementation language at any of the following levels of granularity, at the level of: threads, a single object, a set of objects, the entire system, a variable of an object, an interface, a method.

BRIEF DESCRIPTION OF THE FIGURES

Embodiment of methods according to the invention are described hereinafter with reference to the accompanying drawings in which.

DETAILED DESCRIPTION OF THE INVENTION

The invention is now described hereinafter in terms of its preferred embodiments with reference to the accompanying drawings. These embodiments are set forth to aid in the understanding of the invention, but are not to be construed as limiting.

Figure 1:
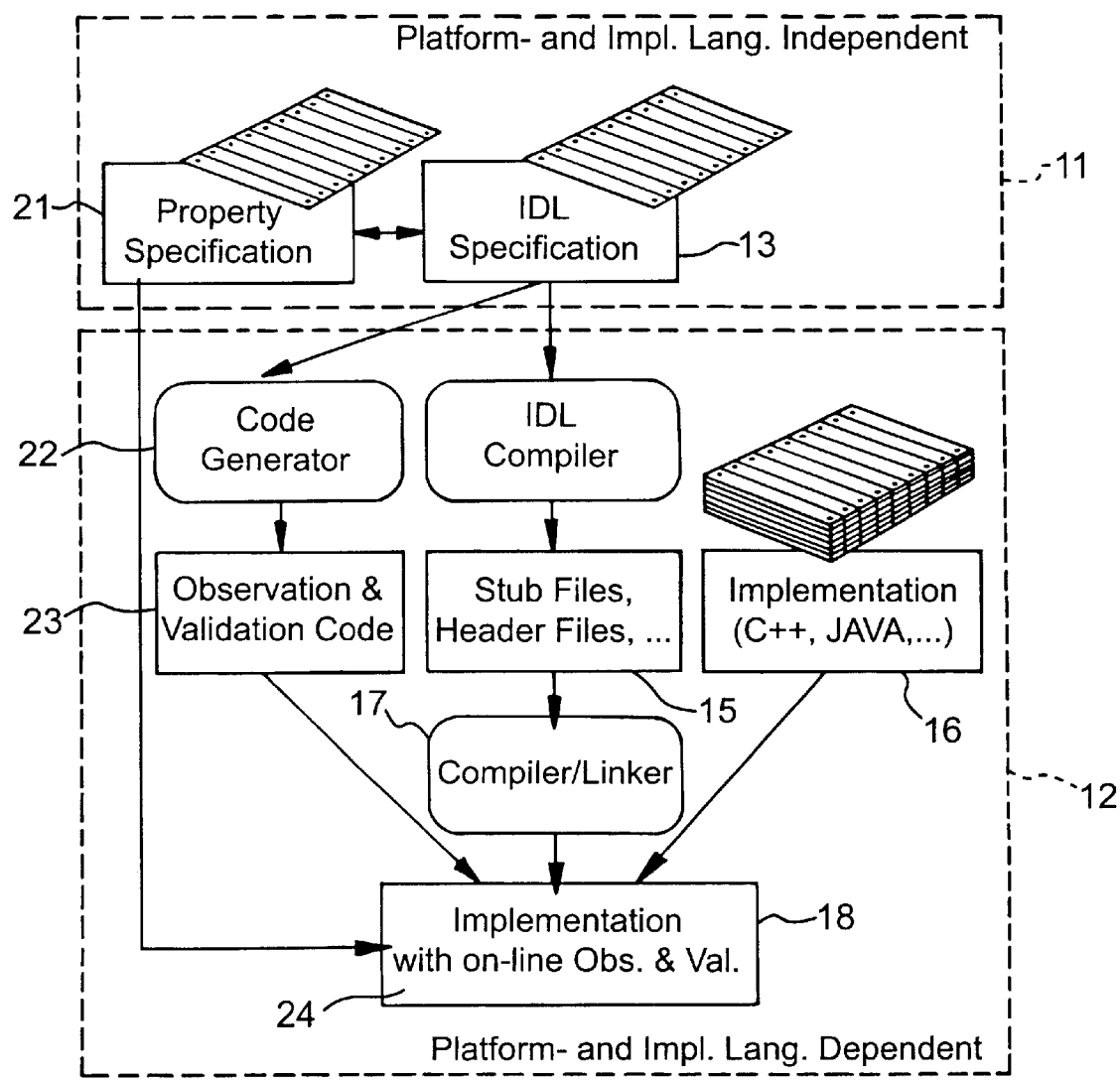
FIG. 1 shows an overview of a typical development process of distributed applications in the middleware CORBA (Common Object Request Broker Architecture) framework.

FIG. 1 shows an overview of a typical development process of distributed applications in the CORBA (Common Object Request Broker Architecture) framework. The white boxes depict the normal development process of distributed applications; the gray boxes describe the extensions proposed in this paper. Rounded boxes denote tools. Development at level 11 is independent from the platform and from the implementation language. Development at level 12 is dependent from the platform and from the implementation language.

During the development process of a distributed application, the IDL (Interface Definition Language) specification 13 of the interfaces is passed to an IDL compiler 14 associated with the middleware which generates stub code and header files 15 which are then linked to the actual implementation code by a compiler/linker 17 thereby shielding the developer of the distributed application from the difficult task of handling the distribution issues.

In addition to passing the IDL specifications to the IDL compiler, those specifications are sent to a code generator tool 22. This code generator tool 22 generates generic observation code 23 which will be linked to the actual implementation and form the instrumentation part of the implementation 18 with on-line Observation and Validation.

When the implementation is running, this instrumentation will generate traces. The trace generation machinery is automatically added by code generator tool 22. The trace generation machinery is configured dynamically by the user, thus making possible to dynamically change the traces to be collected. The approach for instrumenting the code in a method according to the invention is presented in Section 1 hereinafter.

The traces sent by the instrumentations are collected by an observer 24. By using the operations available at its interface, objects can report the event-occurrences to the observer. It is therefore irrelevant that the implementation of the Observer is written in the same implementation language as the distributed application. This means that the code generator introducing the trace generation mechanism is the only part that depends on the implementation language used for developing the application.

The architecture of the observer is divided into two parts:

The monitoring part is concerned with the activation and parameterization of the instrumentation added in each object, and the handling of the traces. The Monitoring part activates and parameterizes the instrumentation of the object, so that they report only specific event-occurrences. The Monitoring part is described in detail in Section 2 hereinafter.

The testing part interprets and transforms the properties into executable code via the transformation into Finite State Machines (FSMs). During this process, it also identifies the events that are involved for the testing of the property and dynamically gives the parameterized and activation information to the Monitoring part. Finally, at run-time the traces are used for checking whether a violation of the properties takes place. When a property is violated, an error is discovered. The Testing part is described in detail in Section 3 hereinafter.

Figure 2:
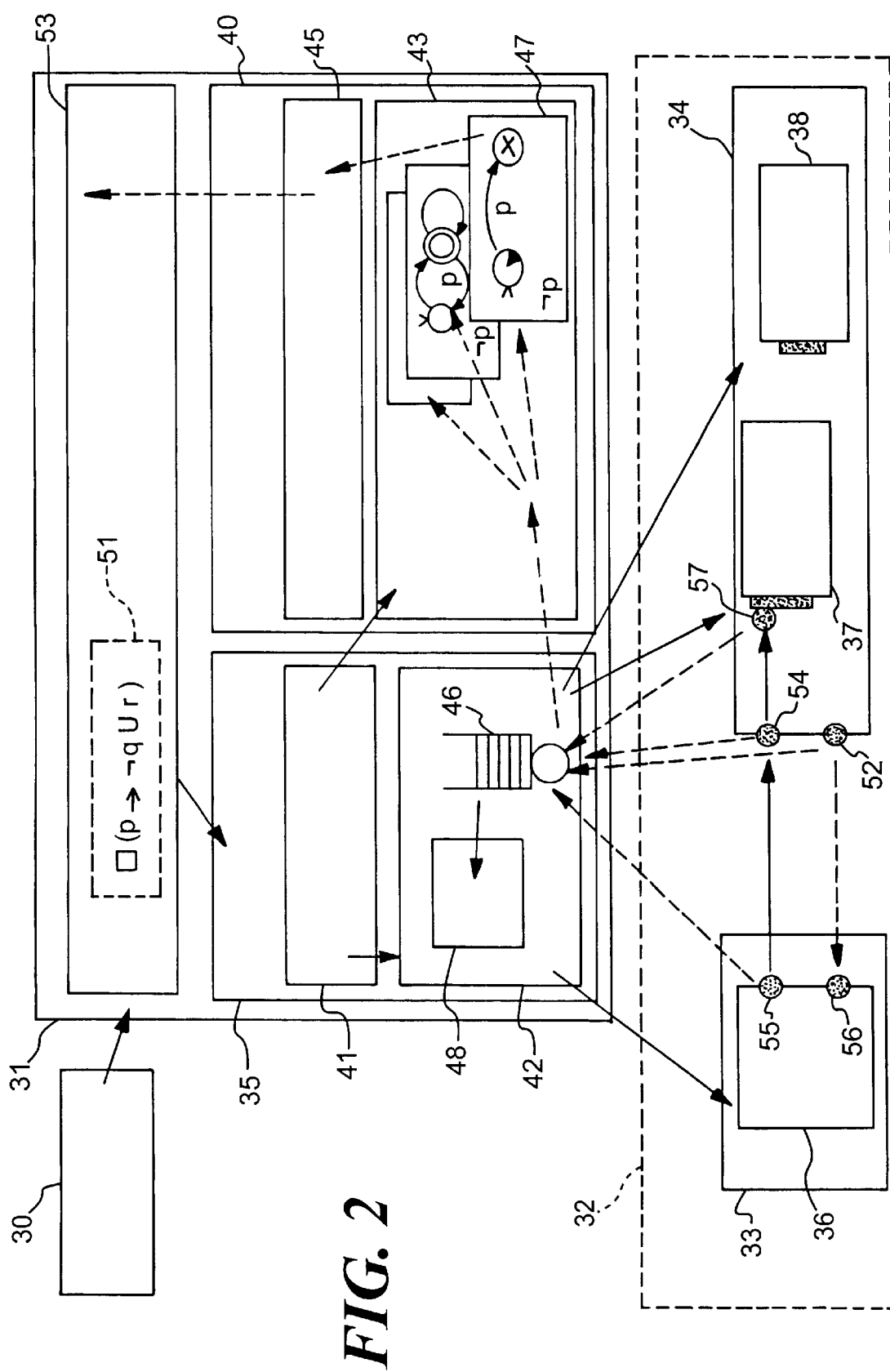
FIG. 2 shows an example of an overall monitoring and testing scenario according to the invention.

An example of an overall monitoring and testing scenario according to the invention for the case of a simple client-server application is depicted in FIG. 2. As shown by this figure in such an scenario a user 30 has basically to do with a system comprising a client 33, a server 34 and an observer 31 which is a software for monitoring and testing. Client 33 has e.g. an object 36. Server 34 has e.g. objects 37 and 38. Observer 31 comprises a monitoring part 35 and a testing part 40. Monitoring part 35 contains a properties translator 41 and an observation manager 42. Testing Part 40 contains a properties checker 43 and an error handler 45. The abstraction level that is provided by an IDL specification in the case of CORBA or any other interface definition language is such that it is an excellent source for expressing properties, e.g. property 51 in FIG. 2. Such properties are entered by user 30 via a graphical user interface 53 and then translated into a FSM by properties translator 41. Each property 51 is analyzed and observation manager 42 is informed of what information is to be monitored. Observation manager 42 parameterizes the instrumentations, which are the interceptors 52, 54, 55, 56, 57 within system 32. Up to this point, system 32 is configured to send notifications to the monitoring part 35 of observer 31 each time a relevant event occurs in system 32. Observation manager 42 encompasses a mechanism 46 ensuring a consistent order of the notifications received. The information sent via the notifications can be displayed by means of graphical user interface 53 and can also be stored in a suitable storage or recording mechanism 48 for post-processing. Observation manager 42 transmits the monitored information to the testing part 40 which carries out a check for violation of behavioral constraints by means of properties checker 43. For this purpose, the state of each Finite State Machine (FSM) 47 in properties checker 43 is updated to reflect the new global state of the system 32 under test. Whenever testing part 40 finds a property violation, testing part 40 transmits this information to error handler 45, where an error message is displayed on the screen of graphical user interface 53. In summary, the only action that user 30 has to perform is to enter specific properties by means of graphical user interface 53, said properties being entered dynamically at runtime; the remaining work, including the instrumentation, is done automatically.

Within the scope of the invention, properties can be expressed at different levels of granularity: properties on threads, on single objects, properties involving clusters of objects, properties representing specific behavior of an entire application. When expressing properties the user can concentrate on a selected set of constraints that he expects to be exhibited by the system; it is not necessary to specify the behavior of the entire system.

1) Instrumentation

In order to monitor the events happening in the system, it is useful to be able to interpose a mechanism on the invocation (and response) path(s) between a client and a server. For example, in the CORBA middleware specification, there is a standardized notion that can be used for precisely this purpose: the Interceptors.

Within the scope of the invention the assumption is made that a run-time observation mechanism, that is called "Filter" hereinafter, is provided by the distributed platform. This assumption is not restrictive: in the case where such a mechanism is not offered by the distributed platform, a proxy object that plays the role of the Filter can be added for each object within the system.

The breakpoints provided by the Filters are used to send traces to the Observer. Filters are put in each object but activated and parameterized only as needed, thus, optimizing the number of traces generated and minimizing the intrusive impact on the system. The functionality of the code added in each Filter encompasses:

- a notification mechanism which is exactly the same for each object of the system. A notification is an operation carrying the trace generated invoked on the Observer. A preferred embodiment of the invention uses an asynchronous reporting method (as opposed to a synchronous method). It minimizes the impact of the monitoring mechanism on the system; the processing power of the Observer does not affect the computation rapidity of the application
- a selection mechanism which allows selecting specific data to be monitored per object. This selection mechanism is based on an operation select} that is offered by each object (via its Filter), and a table containing all the data that can be monitored on the object. A special field is reserved for marking if a data ha s to be monitored.
- some specific code that guarantees the causal dependencies (order) of notifications. This mechanism is presented in the following section.

2) Monitoring

In general, it cannot be assumed that the middleware guarantees that the Observer will receive the notifications in the same order in which they have been sent. Therefore, the establishment of the "true" order of the events is mandatory in order to be able to follow what happened in the system.

The system of logical clocks is used to preserve the causal ordering of notifications. Causal ordering is the natural extension of FIFO (first in first out) ordering in the case of more then one sender and receiver.

The algorithm used to reconstruct the causal ordering of notifications is based on the so called RST algorithm (called so after the names of its authors Raynal, Schiper and Toueng, as in the publication: Raynal Michel, Schiper Andre and Toueng Sam "The causal ordering abstraction and a simple way to implement it" in Information Processing Letters, vol 39, pp 343–350, 1991). This algorithm is only used to ensure that the causal ordering can be reconstructed at the Observer site. Each object of the system is associated with a vector timestamp. Each element of the timestamp is a pair where the first element is the object identifier of the object sending the notification hereinafter called object A and the second element is the number of notifications sent to the observer by object A as known by each other object of the system.

The number of notifications sent by each object is propagated through the system by piggybacking the time-stamp with the requests. The size of the timestamp is equivalent to the number of objects in the system. As the number of objects in the system evolutes (depending on the creation and deletion of objects) the algorithm used within the scope of the invention is capable of maintaining a dynamically sized time-stamp.

3) Testing

The formalism used to express properties is Linear Time Temporal logic (LTL). Unlike other proposal in the domain of specification-based testing, within the scope of the invention properties are not restricted to safety formula.

In order to be checked at run-time, the LTL properties have to be translated into some machine readable form. Different approaches, well known in the literature and tools are available for translating LTL formula into FSMs.

4) Domain of Applicability

The invention has several domains of applicability, generally being those in which the testing software is crucial, and in particular when this testing must be performed on the real implementation rather than on an abstract model of the implementation, and where the software are built by the use of a middleware, for example:

- development of communication softwares (as in the publication: X. Logean, F. Dietrich, J.-P. Hubaux, S. Grisouard, P.-A. Etique "On applying formal techniques to the development of hybrid services: challenges and directions", in IEEE communication magazine, July 1999),
- detection of feature interaction in communication systems,
- development of Internet software (e.g., electronic Banking, electronic Commerce),
- development of multimedia application (e.g., videoconference),
- development of large distributed software (e.g., automation, network management, database management)
- supervision of softwares (e.g., to dynamically add new alarms to be raised at runtime, without modifying the implementation code of the software, e.g., for the supervision of hardware equipments by their software).

The invention has been described with reference to specifically preferred embodiments. Additional embodiments within the skill of an artisan and the spirit of the invention are contemplated and intended to be included within the inventive concept.

APPENDIX

FIG. Number Correspondence for FIGS. 1 and 2

| | |
|---|---|
| 0 | |
| 1 | |
| 2 | |
| 3 | |
| 4 | |
| 5 | |
| 6 | |
| 7 | |
| 8 | |
| 9 | |
| 10 | |
| 11 | |
| 12 | |
| 13 | IDL specification |
| 14 | IDL compiler |
| 15 | stub code and header files |
| 16 | implementation (C++, JAVA, . . . ) |
| 17 | compiler/linker |
| 18 | implementation with on-line monitoring and testing |
| 19 | |
| 20 | |
| 21 | |
| 22 | code generator tool |
| 23 | observation & validation code |
| 24 | monitoring and testing parts of 18 |
| 25 | |
| 26 | |
| 27 | |
| 28 | |
| 29 | |
| 30 | user |
| 31 | observer |
| 32 | system under test |
| 33 | client |
| 34 | server |
| 35 | monitoring part |
| 36 | object |
| 37 | object |
| 38 | object |
| 39 | |
| 40 | testing part |
| 41 | properties translator |
| 42 | observation manager |
| 43 | properties checker |
| 44 | |
| 45 | error handler |
| 46 | order ensuring means |
| 47 | Finite State Machine |
| 48 | recording mechanism/storage means |
| 49 | |
| 50 | |
| 51 | property |
| 52 | interceptor |
| 53 | graphical user interface |
| 54 | interceptor |
| 55 | interceptor |
| 56 | interceptor |
| 57 | interceptor |
| 58 | |
| 59 | |

What is claimed is:

1. A method for on line monitoring the run-time behavior of middleware based, distributed application software, comprising:

defining events capturing the run-time behavior of said distributed application software, said distributed application software having a plurality of distributed components running on a plurality of platforms, communication among said distributed components being enabled via middleware, said events being defined based on an abstraction of said distributed application software, said abstraction being provided by said middleware;

automatically generating, in response to said defined events, observation and validation code in said distributed application software, said observation and validation code being capable of generating traces of said defined events and sending said traces to an observer; and sending, by said observation and validation code after detecting the occurrence of an event at run time of said distributed application software, a trace to said observer to report the occurrence of said detected event, wherein, said detected event being one of said defined events, and information, carried by said trace relating to said detected event, including the order of occurrence of said detected event and the location in said application software where said detected event occurs.

2. The method according to claim 1, wherein said defined events are generic for middleware softwares.

3. The method according to claim 1, wherein said defined events are one of application events, error events, and breakpoints.

4. The method according to claim 1, further comprising dynamically selecting at least one event at run-time based on said defined, said run-time behavior of said distributed application software being monitored through detecting the occurrence of said at least one selected event.

5. The method according to claim 1, wherein said defined events are at least one of:

directly identifiable from said abstraction specified in terms of said middleware; and defined using an interface definition language associated with said middleware.

6. The method according to claim 1, wherein said traces are asynchronously transmitted to said observer.

7. The method according to claim 1, wherein said traces sent to said observer are displayed by means of a graphical user interface, said traces being represented by a time line, a table or a graph.

8. The method according to claim 1, wherein said traces sent to said observer are stored for post-processing.

9. The method according to claim 1, wherein said order of the occurrence of said detected event reported to the observer is reconstructed according to one of a logical clock system, a synchronization protocol, and a distributed processing environment in which said distributed application software is executed.

10. A method for on-line testing the run-time behavior of middleware based, distributed application software, comprising:

monitoring the run-time behavior of said distributed application software by means of a method including:

defining events capturing the run-time behavior of said distributed application software, said distributed application software having a plurality of distributed components running on a plurality of platforms, communication among said distributed components being enabled via middleware, said events being defined based on an abstraction of said distributed application software, said abstraction being specified via said middleware, automatically generating, in response to said defined events, observation and validation code in said distributed application software, said observation and validation code being capable of generating traces of said defined events and sending said traces to an observer, and sending, by said observation and validation code after detecting the occurrence of an event at run time of said distributed application software, a trace to said observer to report the occurrence of said detected event, wherein, said detected event being one of said defined events, and information, carried by said trace relating to said detected event, including the order of occurrence of said detected event and the location in said application software where said detected event occurs; and checking, by a checking mechanism, whether said run-time behavior observed through the occurrences of said defined events violates properties or constraints that are dynamically specified.

11. The method according to claim 10, wherein said properties or constraints are expressed in terms of at least one defined event by means of a formal language, the expression of said properties or constraints being automatically translated; at run-time, into Finite State Machines or some means derived therefrom, wherein said at least one defined event either being selected at run-time from said defined events so that the run-time behavior of said distributed application software is monitored through detecting the occurrence of said at least one defined event, or being either directly identifiable from said abstraction specified in terms of said middleware or defined using an interface definition language associated with said middleware.

12. The method according to claim 11, wherein said formal language allows the specification of temporal relations of said at least one defined event for the expression of properties.

13. The method according to claim 11, wherein said formal language allows the specification of relations between said at least one defined event of same or different types, said different types including application events, error events and breakpoints.

14. The method according to claim 11, wherein said formal language allows the specification of procedural dependencies.

15. The method according to claim 11, wherein said translation of properties is carried out automatically.

16. The method according to claim 11, wherein said expression of said properties are independent of the language used to implement any one of a single object, a set of objects, an entire system, a variable of an object, an interface, and a method.

* * * * *